United States Patent [19]

Matsui

[11] Patent Number: 5,604,641
[45] Date of Patent: Feb. 18, 1997

[54] OBJECTIVE LENS ACTUATOR AND METHOD FOR MANUFACTURING THE SAME

[75] Inventor: Tsutomu Matsui, Tokyo, Japan

[73] Assignee: NEC Corporation, Japan

[21] Appl. No.: 578,091

[22] Filed: Dec. 26, 1995

Related U.S. Application Data

[62] Division of Ser. No. 388,523, Feb. 14, 1995.

[30] Foreign Application Priority Data

Feb. 14, 1994 [JP] Japan ............................ 6-17092

[51] Int. Cl.[6] ........................................ G02B 7/02
[52] U.S. Cl. ............................... 359/824; 359/814
[58] Field of Search ............................ 359/824, 814; 369/44.15, 44.16, 44.22

[56] References Cited

U.S. PATENT DOCUMENTS

| | | | |
|---|---|---|---|
| 4,646,283 | 2/1987 | Ito | 369/256 |
| 4,669,823 | 6/1987 | Iguma | 359/824 |
| 4,927,235 | 5/1990 | Narumi | 359/814 |
| 5,046,820 | 9/1991 | Saekusa | 359/814 |
| 5,056,891 | 10/1991 | Masunaga | 359/813 |
| 5,323,369 | 6/1994 | Kim | 369/44.15 |
| 5,513,047 | 4/1996 | Matsui | 359/824 |

FOREIGN PATENT DOCUMENTS

| | | |
|---|---|---|
| 61-41866 | 2/1988 | Japan . |
| 1-72338 | 3/1989 | Japan . |
| 2-30834 | 5/1989 | Japan . |

Primary Examiner—Georgia Y. Epps
Assistant Examiner—Ricky Mack
Attorney, Agent, or Firm—Ostrolenk, Faber, Gerb & Soffen, LLP

[57] ABSTRACT

It is the object of the invention to decrease the gain peak of an objective lens holder at a natural frequency of a biaxial objective lens actuator used in an optical disc a system using a reproducing-only-disc, a write-once-disc or a erasable disc. The out-line of a construction is that each of support for an objective lens holder is composed of plural elastic wires surrounded damping material (silicone, for example), and a damping effect can be achieved by shearing stress caused in damping material, and each of support springs passes through a hole of a damping box, wherein the clearance between the support spring and the inner wall of the hole is filled with gelled damping material. A further improvement of damping can be achieved by the damping box.

7 Claims, 6 Drawing Sheets

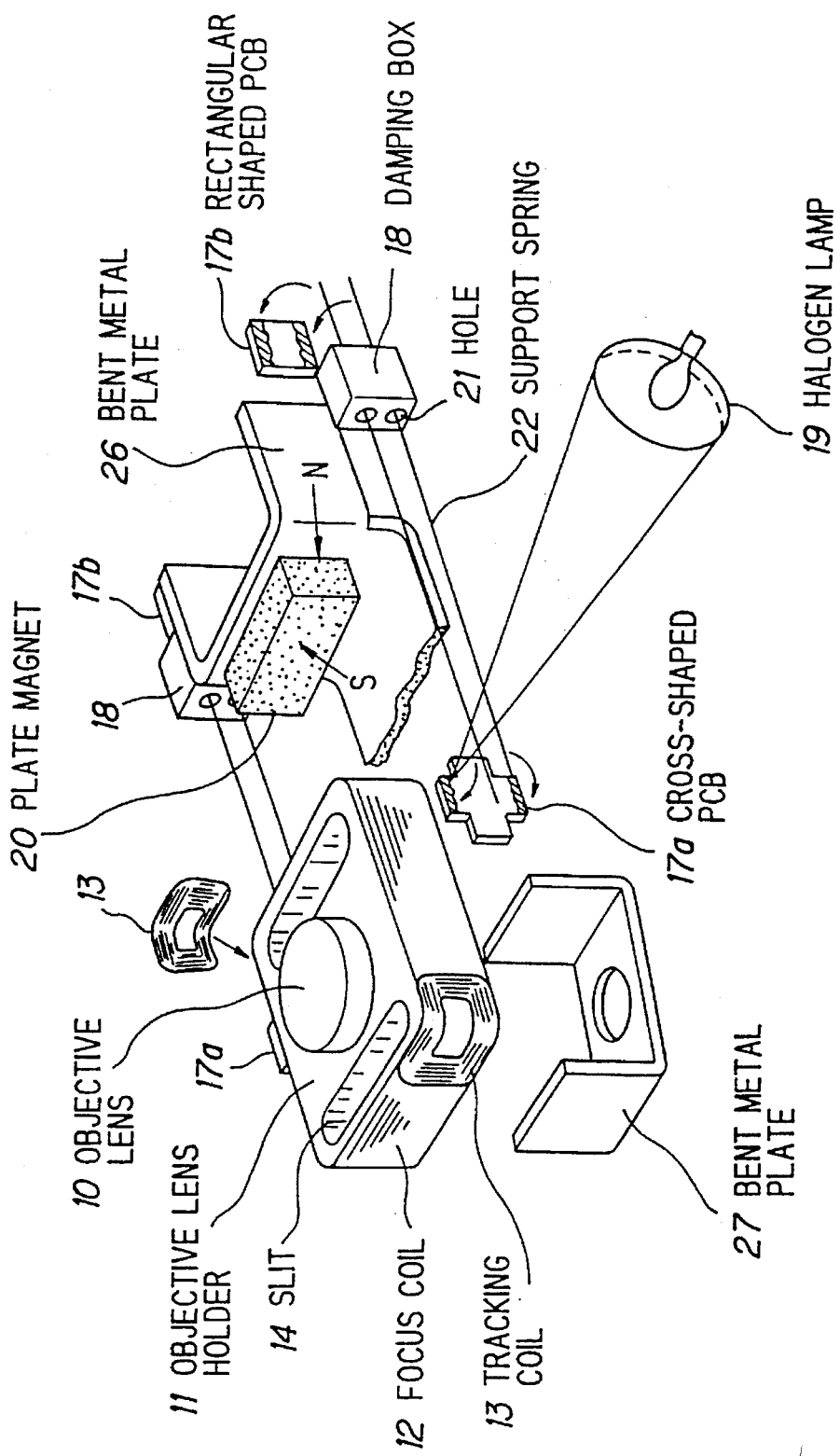

OBJECTIVE LENS ACTUATOR AND METHOD FOR MANUFACTURING THE SAME

This is a division of application Ser. No. 08/388,523, filed Feb. 14, 1995.

FIELD OF THE INVENTION

The invention relates to an objective lens actuator in an optical head to deal with various kinds of optical discs, such as a reproducing-only-disc, a write-once-disc and an erasable disc, and a method for manufacturing the objective lens actuator.

BACKGROUND OF THE INVENTION

An optical head focuses a light beam as a small spot on a recording track formed on a information recording surface of an optical disc, serving as a recording medium, and records, reproduces and erases in accordance with the variation of a light reflected from the information recording surface. Therefore, the light beam should be accurately focused on the recording track at all times, in spite of disc warp and disc vibration caused by the rotational movement of the disc. Focusing of the light beam is controlled by plant displacement of the objective lens in the direction of its optical axis (focus servo, hereinafter).

Since the light spot should precisely trace the recording track at all times, the position of the objective lens is minutely controlled also in a direction, being perpendicular to the recording track (tracking servo, hereinafter).

Technologies on the focus and tracking servos are disclosed on Japanese Patent Kokai 5-68013, 4-319537, 62-65243 and 4-324127.

An apparatus playing the most important role in the above mentioned control of the light spot is an objective lens actuator. The important structural elements of this apparatus are an objective lens holder and four supporting members for said lens holder. The objective lens holder consists of an objective lens mounted thereon and a coil assembly, which generates electromagnetic forces for servo drive. One end another ends of a supporting member are fixed to the objective lens holder and an actuator base, respectively. In many cases, the supporting member is an elastic wire or an elastic leaf spring. A very important problem is hunting of the objective lens holder, which could arise in servo-drives of the objective lens holder. Then, improvements in damping characteristic of the movements of the objective lens holder are extremely important, and considerable efforts should be made to improve not only the construction of the supporting system, but also the structure of the supporting member itself from this point of view.

Another important problem is the remaining mechanical stress in each supporting member due to the heat in a soldering process. The attitude of the optical lens to the actuator base becomes in accurate of account of said remaining mechanical stress. Then, the improvement of the soldering process is very important.

SUMMARY OF THE INVENTION

Accordingly, it is an object of this invention to provide an objective lens actuator, in which a damping characteristic is remarkably improved compared with the damping characteristic of a conventional objective lens actuator.

It is a further object of this invention to provide a method for manufacturing an objective lens actuator without remaining mechanical stresses in supporting members for an objective lens in spite of soldering.

According to the first feature of this invention, an objective lens actuator comprises:

an objective lens holder which is movable in focus and tracking directions in accordance with their respective control signals;

an actuator base which serves as a foundation for other structural elements;

four support springs for the objective lens holder, each of which is composed of plural elastic wires with damping material filling clearances therebetween; and damping boxes being fixed to the actuator base and having holes bored therethrough, each of which contains one of the four support springs surrounded with gelled damping material.

According to the second feature of this invention, a method for manufacturing an objective lens actuator comprises the steps of:

constructing two magnetic circuits, a portion of which serves as an actuator base, by combining two bent metal plates and two plate magnets;

constructing an objective lens holder by mounting an objective lens thereon;

constructing a coil assembly combining a focus coil wound around the objective lens holder and a pair of tracking coils stuck on the focus coil;

constructing four support springs for the objective lens holder, each of which is composed of plural elastic wires with damping material filling a clearance therebetween, and fixed to the actuator base through a damping box;

constructing an electromagnetic force generating means by combining the magnetic circuits and the coil assembly in such a way that the coil assembly is movable in focus and tracking directions;

sticking two first and two second printed circuit boards on the objective lens holder and the actuator base, respectively;

coating all of the printed circuit boards with cream solder;

supporting one wire of plurality elastic wires in each of the four support springs between the first and second printed circuit boards, wherein the one wire of plurality elastic wires is in a no mechanical stress condition and both of its ends contact with cream solders on the first and second printed circuit boards, respectively; and soldering the both ends and the first and second printed circuit boards by non-contact heating.

BRIEF DESCRIPTION OF THE DRAWINGS

The invention will be explained in more detail in conjunction with appended drawings, wherein:

FIG. 3 is an exploded and perspective view of an objective lens actuator according to the invention.

DESCRIPTION OF THE PREFERRED EMBODIMENTS

Figure 1:
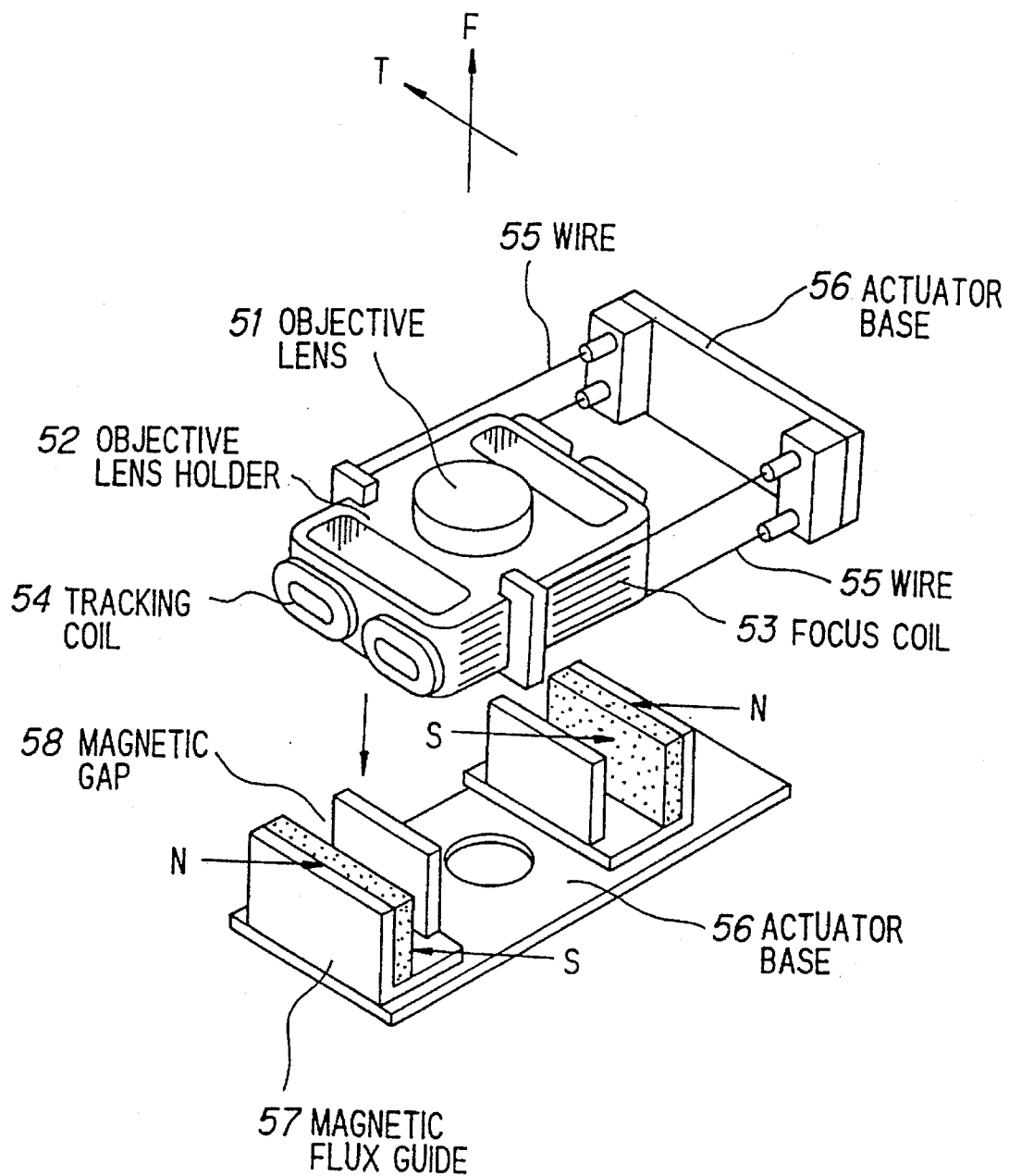
FIG. 1 shows the structure of a conventional actuator.

Before explaining the invention in the preferred embodiments, the aforementioned conventional objective lens actuator will be explained, with reference to FIG. 1 which shows the structure of a four-wire supported objective lens actuator for servo-driving the objective lens, which is used in a conventional optical head. As shown in FIG. 1, a disassembled and perspective drawing, an objective lens 51 is mounted on an upper surface of a rectangular-shaped lens holder 52. On the outer periphery of the objective lens holder 52, a focus coil 53 is so wound that the central axis of this coil runs in parallel with the optical axis of the objective lens 51. Four rectangular shaped tracking coils 54 are stuck on both sides of the focus coil 53.

The focus coil 53 and the tracking coils 54 are placed in a magnetic gap 58, which is the portion of a nearly closed magnetic circuit comprising a plate magnet, a L-shaped magnetic flux guide 57 and magnetic yoke. In the magnetic gap 58, the direction of a magnetic flux is perpendicular to the conductors of the coils mentioned in the above, and the coils can move in the focus and tracking directions by the electro-magnetic forces acting on the coil conductors.

The objective lens holder 52 is supported by four wires 55, the left ends of which are fixed to an actuator base 56 as shown in FIG. 1. The wires 55 are made of elastic metal such as phosphor bronze. In addition to the above mentioned function, the four wires (the elastic supporting members or the spring supporting members) 55 have a function to electrically connect print circuit boards located on the objective lens actuator 52 to ones located on an actuator base 56.

In the conventional actuator, the objective lens holder is allowed to move not only in the focus and tracking directions, wherein the above mentioned directions are shown as arrows F and T, respectively, in FIG. 1, but also in a direction being perpendicular to said two directions. Moreover, the lens holder is permitted to rotate around the three orthogonal rotational (θx, θx and θz) axes mentioned in the above. However, the objective lens can follow the disc vibrations in the focus and tracking directions.

Aside from problems on structures, a very important problem in the operation of a conventional four-wire supported actuator is the movement characteristic of the lens holder, especially a stability in the case of pulling in servo. If the lens holder is directly supported by phosphor bronze wires without any damping device in the above mentioned structure, a difference between a resonance amplitude at a natural frequency (a peak gain, hereinafter) and a DC amplitude (a DC gain, hereinafter) becomes as large as 30 dB. When the gain peak is large as mentioned in the above, pulling-in of focus and tracking servos becomes unstable. Especially, in the case of pulling-in tracking servo, a hunting could arise in the natural frequency, in positioning in disc radius direction of the lens holder by a driving force of a positioning device acting in a radial direction. To achieve stable pulling-in servos, structures of supporting members and materials should be so selected that the gain peak becomes lower than −20 dB.

Hitherto, not a literature has referred to the guide line for designing this apparatus, and they have been obliged to design by the method of trial and error. As a more reasonable method compared with conventional ones, they can cite the modal strain energy method, in which damping factors of materials are supplied to a computer as input data, and numerical analyzes can be progressed to some extent. However, this method cannot lead them to the design concept on a fundamental structure.

In the construction shown in FIG. 1, the printed circuit board (PCBs, hereinafter) stuck on the objective lens holder 52 and the other ones on the actuator base 56, which serves as the foundation in assembling process of this apparatus, are connected by the phosphor bronze wires, wherein the both ends of the wires 55 are soldered to the aforementioned PCBs, respectively. However, the stiffness of the wires are not so large, and then, if a soldering iron is used in an assembling process, the wires are mechanically stressed. Therefore, when the actuator is removed from a jig, the position and attitude of the objective lens holder, being supported by four wires, become imprecise with respect to the actuator base.

It is the feature of the invention to clarify the structures of damping devices and damping materials used in the device, being suitable for decreasing the gain peak, and to provide an objective lens actuator with stable pulling in focus and tracking servos.

Another feature of the invention is to provide a manufacturing method, in which non-contact soldering can be applicable, when the supporting wires are soldered to the PCB.

Figure 2A:
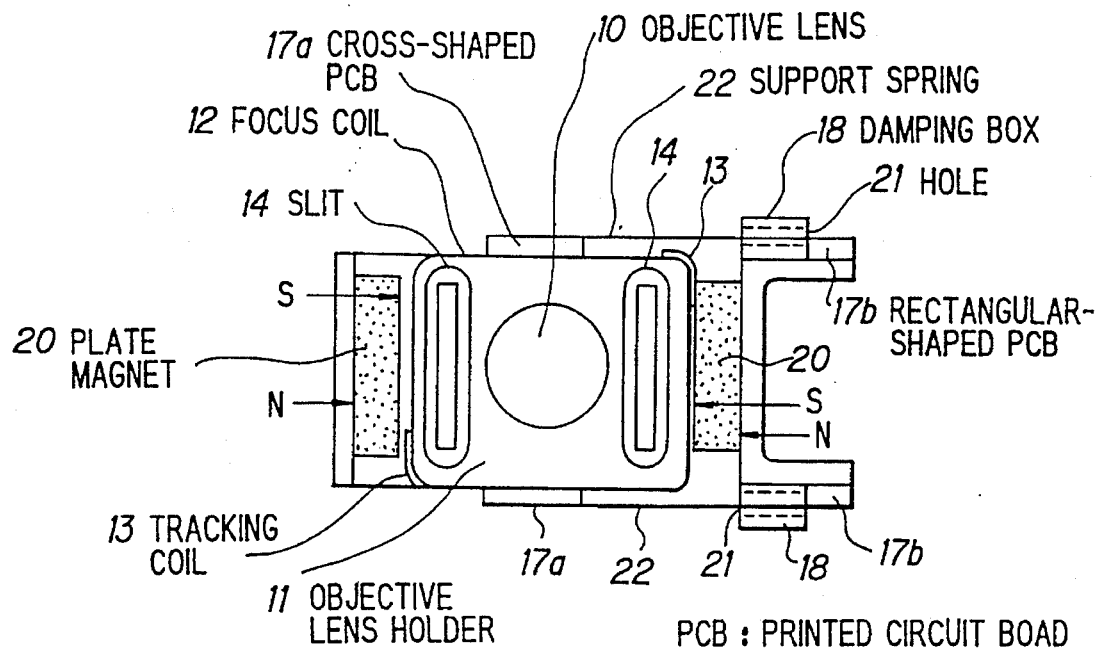
FIGS. 2A and 2B are a plan view and a front view of an objective lens actuator according to the invention, respectively.
Figure 2B:
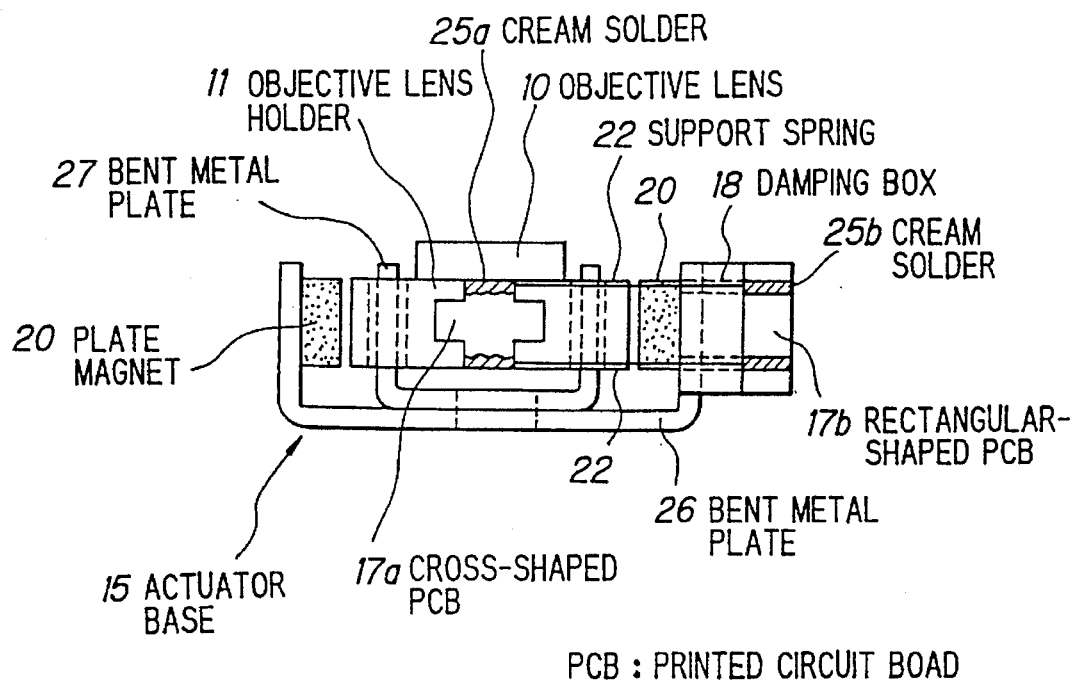

Next, preferred embodiments according to the invention will be explained referring to drawing FIGS. 2A and 2B which are respective plan and front views of an actuator according to the invention as a preferred embodiment. FIG. 3 is the disassembled and perspective drawing of the actuator that is shown in FIGS. 2A and 2B.

A focus coil 12 is wound on the outer periphery of a lens holder 11, and a pair of tracking coils 13 with flat and rectangular configurations are stuck on the corners on the same diagonal of the focus coil 12. The rectangular shaped lens holder 11 is provided with a pair of slits 14, into which yokes, which serve as the portions of magnetic circuits as mentioned later, are inserted. Such yokes are constituted by the spaced parallel arms of ben metal plate 27. Moreover, a pair of cross-shaped printed circuit boards 17a are stuck on the both sides of the lens holder 11.

One of the plurality wires composing support spring 22, which will be mentioned later, is soldered to a cross-shaped printed circuit boards 17a by means of non-contact soldering. Accordingly, the cross-shaped printed circuit board 17a are coated with cream solder 25a. An objective lens 10 is mounted on the lens holder 11.

On the other hand, an actuator base 15, which serves also as portions of magnetic circuits, is composed of two bent metal plates, 26 and 27. The bent metal plate 27 is shaped into an U-shaped yoke, being put on the other bent metal plate 26, as seen in FIG. 2B. These bent metal plates 26 and 27 are stuck together. The vertical portions of the bent metal plate 27 are inserted into the respective slits 14 on the lens holder 11. Plate magnets 20 are stuck on the inner surfaces of the respective vertical portions of the bent metal plate 26. A pair of rectangular-shaped PCB 17b, together with a pair of damping boxes 18, are fixed to the both sides of the bent metal plate 26 near portions where the wires are attached to the bent metal plate 26.

Similarly to the case of the soldering to the PCB 17a, the rectangular shaped PCB 17b is coated with cream solder 25b, in order to solder a wire, which is one of the plural wires composing the supporting spring 22 and is soldered to the cross-shaped PCB 17a, to the PCB 17b by means of non-contact soldering.

As mentioned previously, the supporting spring 22 is composed of plural wires (two or three wires, for example) and the clearance between the wires is filled with silicone rubber. A damping effect can be achieved by the shear stress caused in this structure. Both ends of one of the plurality of wires are soldered to the cross-shaped PCB 17a and the rectangular shaped PCB 17b, respectively.

The damping box 18 is provided with the two holes 21 (FIG. 4), into which the support springs 22 are inserted respectively without contacting the inner surfaces of holes 21, and the clearances between the supporting springs 22 and the inner surfaces of the holes 21 are filled with silicone-gel.

Figure 4:
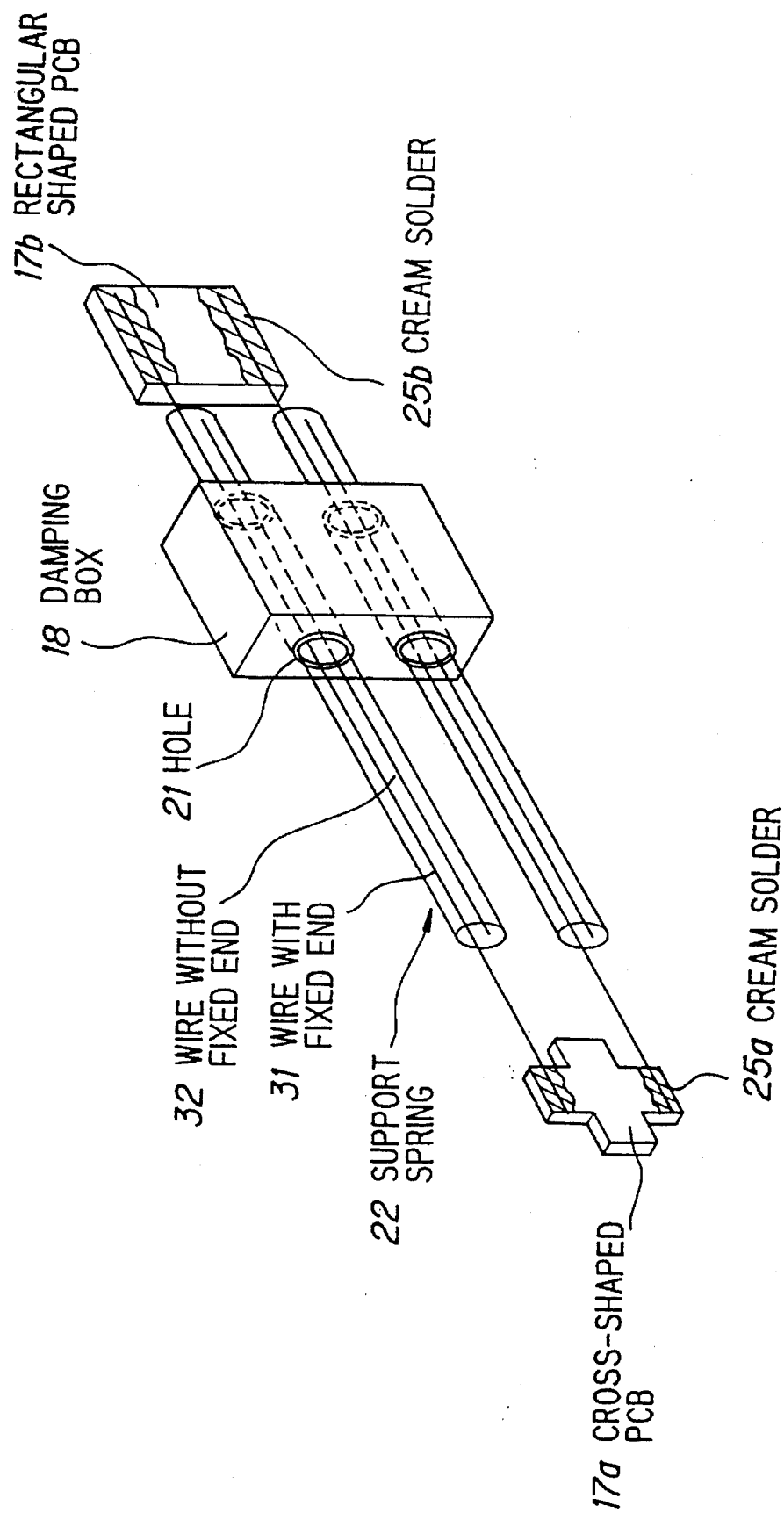
FIG. 4 is a perspective of the damping box of an actuator according to the invention.
Figure 5A:
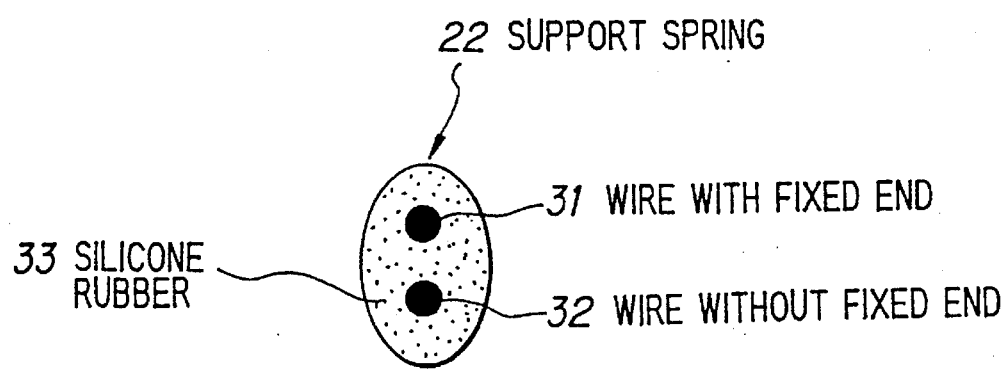
FIGS. 5A and 5B are cross-sectional views of a support spring and damping boxes according to the invention, respectively.
Figure 5B:
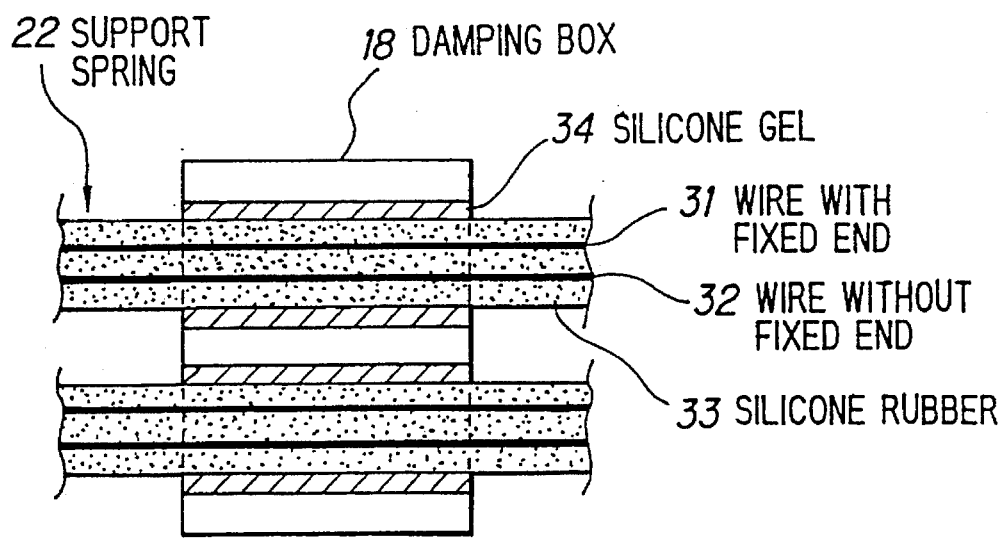

In the aforementioned structure, the function of the support springs 22 and the damping box 18 is to decrease the peak gain at the natural frequency, which will be explained in more detail referring to FIGS. 4–5. FIG. 4 is a perspective showing that the support springs 22 are fitted to the holes 21 in the damping box 18. FIG. 5A shows a transverse cross-sectional view of the support spring 22, and FIG. 5B shows a longitudinal cross-sectional view of the damping-box 18 and its neighboring portion. Support spring 22 is composed of two wires, 31 and 32, and the wire 31 is longer than the wire 32. These two wires 31, 32 are set in parallel with each other and covered with silicone rubber 33 except for the ends of the wire 31. It should be noted that the wire 31 has fixed ends, but the wire 32 has not fixed ends. In other words, the both ends of the wire 32 are free.

The rectangular parallelepiped shaped damping boxes 18 are stuck on the both sides of the bent metal plate 26, which is one of the two bent metal plates composing the magnetic circuits. Each of the damping boxes 18 is provided with two holes 21. The two support springs 22 are inserted into these holes 21 respectively, without contacting with inner walls of these holes. Clearances between the support springs 22 and the inner walls of the holes 21 are filled with silicone-gel 34.

FIG. 5B shows a cross-sectional view of the damping box 18 and its neighboring portions of the wires, wherein the cross-section runs in parallel with the wires 31 and 32. It can be seen that, the wires 31 and 32 are covered by silicone rubber 33, and the space between the outer periphery of rubber 33 and inner wall 21 is filled with silicone-gel 34.

Next, an idea on the structure of the actuator in which the objective lens holder is supported by the support springs without inclination to the actuator base and another idea on assembling the actuator will be explained. Generally, the objective lens of an optical head for high density recording and high bit rate transfer has a numerical aperture being larger than 0.55. In designing the apparatus for the so called digital recording, it is very important to make a bit length on the track be as short as possible. In the case of Run Length Limited (RLL) modulation, in order to secure the recording density of 0.34 μm/bit for example, the recording density being less than 0.45 μm/mark should be secured. The necessary condition to secure the aforementioned recording density is that the lasing wave length of a light source=680 nm, the numerical aperture of the objective lens 10=0.55 and the beam diameter at normalized power of $e^{-2}$=1.0 μm. In a case that the objective lens with the numerical aperture of 0.55 is used, the inclination of the optical axis of the lens should be established within ±0.2°.

If a conventional soldering iron contacts with the wires and the PCBs in the assembling process, mechanical stresses remain in the wires. Therefore, when jigs are removed after soldering, the lens holder is inclined to the actuator base. Accordingly, in the preferred embodiment of the invention shown in FIG. 3, the cream solders 25a and 25b are coated on the cross-shape PCB 17a and the rectangular shaped PCB 17b respectively in advance, and the both ends of the wire 31 contact with the cream solders 25a and 26b respectively (FIG. 4). In this case, special attention should be paid to realize the condition that there is no mechanical stress in the wire 31. The cream solder 25a and 26b on the PCBs 17a and 17b are heated by the light from a halogen lamp 19, and the both ends of the wire 31 are soldered to the PCBs 17a and 17b respectively. By the above mentioned method, the accurate attitude of the objective lens holder 11 to the actuator base 15 can be established, even when the actuator is removed from the jigs.

Figure 6:
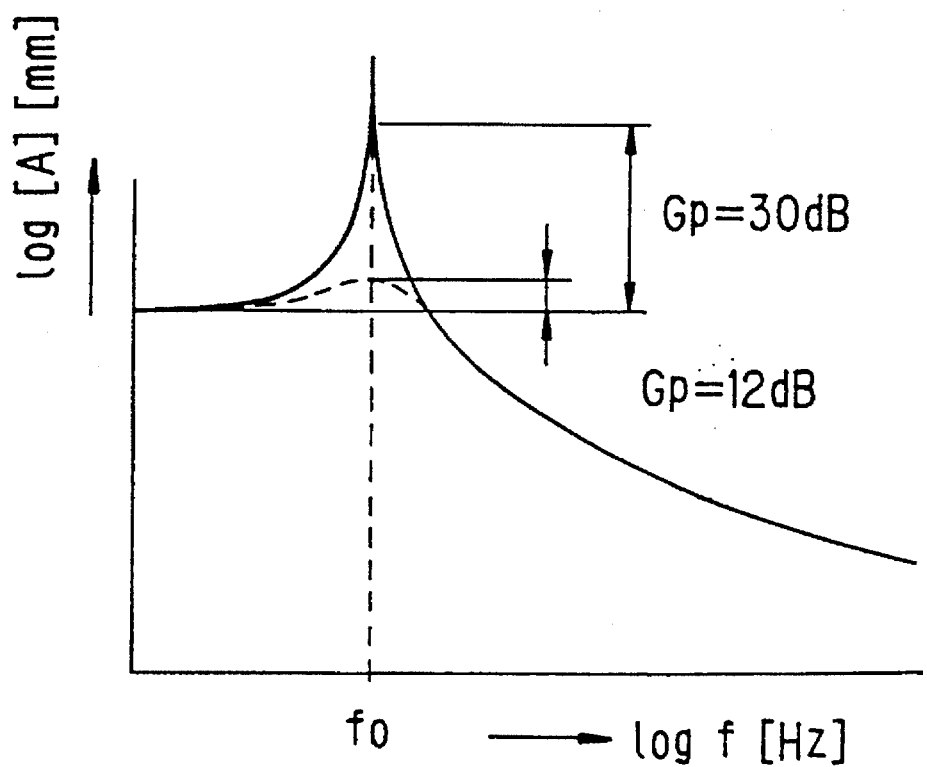
FIG. 6 shows the Bode diagrams for transfer functions which represent the decrease of a gain peak achieved by improvement of damping characteristics of an objective lens actuator according to the invention.

The transfer characteristics of the aforementioned structures are measured to prove the damping effect of the preferred embodiment of the invention, the results of which are shown in FIG. 6. FIG. 6 shows Bode diagrams for transfer functions, in which the decrease of the gain peak at the natural frequency in the embodiment of the invention can been seen.

In the conventional four wire supported actuator shown in FIG. 1, the gain peak is 30 dB. When only the support springs composed of plural wires are introduced, the gain peak becomes 20 dB, and is decreased by 10 dB compared with the one of the conventional actuator. When the damping boxes are additionally introduced, the further reduction of gain peak is 8 dB by the effect of gel-immersion. In this case, the gain peak 12 dB, and the remarkable improvement can be achieved.

It can be seen from Bode-diagrams for transfer function shown in FIG. 6 that the improvement of the damping is as large as 18 dB as compared with the one of the conventional actuator without any damping device, by the damping characteristics of the support springs and gel-immersion according to the invention. As expected from the transfer characteristics, a stable random access becomes possible.

In the objective lens actuator according to the invention, the gain peak at the natural frequency can be decreased down to 20–10 dB, and stable pulling in servo and servo drive can be achieved.

In the method for manufacturing the objective lens actuator according to the invention, the wire, which serves as an electric conductor between the movable objective lens holder and the fixed portion of the actuator base, is set in a non-stressed condition and soldered in the same condition.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching herein is set forth.

What is claimed is:

1. A method for manufacturing an objective lens actuator, comprising the steps of:

constructing two magnetic circuits, a portion of which serves as an actuator base, by combining two bent metal plates and two plate magnets;

constructing an objective lens holder and mounting an objective lens thereon;

constructing a coil assembly combining a focus coil wound around said objective lens holder and a pair of tracking coils stuck on said focus coil;

constructing four support springs for said objective lens holder, each of said springs including a first and a second elastic wire with damping material filling a clearance therebetween, and said support springs being fixed to said actuator base through a damping box;

constructing an electromagnetic force generating means by combining said magnetic circuits and said coil assembly in such a way that said coil assembly is movable in focus and tracking directions;

sticking two first printed circuit boards on said objective lens holder and sticking two second printed circuit boards on said actuator base respectively;

coating all of said printed circuit boards with cream solder;

supporting said first elastic wire in each of said four support springs between said first and second printed circuit boards, wherein said first elastic wire is in a no mechanical stress condition and its ends contact with said cream solder on said first and second printed circuit boards, respectively; and soldering said both of said ends to said first and second printed circuit boards by non-contact heating.

2. A method for manufacturing an objective lens actuator, according to claim 1, wherein:

said non-contact heating is performed by means of light illuminating.

3. A method for manufacturing an objective lens actuator according to claim 1, wherein each of the second elastic wires has both ends thereof that are free.

4. A method for manufacturing an objective lens actuator according to claim 3, wherein said damping material is formed as an elongated element with both said first and second elastic wires extending longitudinally through an individual one of said elements.

5. A method for manufacturing an objective lens actuator according to claim 4, wherein said elongated element is round in transverse cross-section.

6. A method for manufacturing an objective lens actuator according to claim 4, wherein said damping boxes are provided with passages, and each of said elements extends longitudinally through an individual one of said passages.

7. A method for manufacturing an objective lens actuator according to claim 6, wherein a layer of lubricant coats each of said elements where said element passes through said passage box.

* * * * *